United States Patent
Yamada (10) Patent No.: US 8,674,661 B2
(45) Date of Patent: Mar. 18, 2014

(54) VOLTAGE SWITCHING CIRCUIT, SECONDARY BATTERY PROTECTION CIRCUIT, AND BATTERY PACK

(75) Inventor: Ryohji Yamada, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 343 days.

(21) Appl. No.: 13/233,149

(22) Filed: Sep. 15, 2011

(65) Prior Publication Data

US 2012/0069481 A1    Mar. 22, 2012

(30) Foreign Application Priority Data

Sep. 16, 2010  (JP) ................................ 2010-207437

(51) Int. Cl.
*H02J 7/00*    (2006.01)

(52) U.S. Cl.
USPC .......................................... 320/134; 320/162

(58) Field of Classification Search
USPC ......................................................... 320/134
See application file for complete search history.

(56) References Cited

U.S. PATENT DOCUMENTS

| | | | | |
|---|---|---|---|---|
| 5,309,031 A | * | 5/1994 | Stewart et al. ................... | 307/66 |
| 5,631,537 A | * | 5/1997 | Armstrong .................... | 320/118 |
| 5,637,979 A | * | 6/1997 | Tamai et al. ................... | 320/116 |
| 6,777,915 B2 | * | 8/2004 | Yoshizawa et al. ........... | 320/137 |
| 2006/0267557 A1 | * | 11/2006 | Nakano et al. ................ | 320/134 |

FOREIGN PATENT DOCUMENTS

JP    2005-168159    6/2005

* cited by examiner

*Primary Examiner* — Arun Williams
(74) *Attorney, Agent, or Firm* — Cooper & Dunham LLP (57) ABSTRACT

A voltage switching circuit for a secondary battery protection circuit in a battery pack having a negative power supply terminal and a current-detection resistor. The secondary battery protection circuit has a charger negative power supply terminal and a detection circuit. The voltage switching circuit has a first input terminal to which a voltage obtained by converting a current flowing through the current detection resistor is supplied, a second input terminal to which voltages at the negative power supply terminal and at the charger negative power supply terminal are supplied, an output terminal, and a selection terminal. The voltage switching circuit causes an output voltage to switch between the voltages from the first input terminal and the second input terminal according to selection at the selection terminal when an excess current is detected and when the battery pack returns to a chargeable-dischargeable state from a charge-discharge inhibit state.

20 Claims, 3 Drawing Sheets

| SEL | M21, M31 | M22, M32 | M23, M33 | SW_OUT |
|---|---|---|---|---|
| H | ON | OFF | OFF | v- |
| L | OFF | ON | ON | Rsens |

VOLTAGE SWITCHING CIRCUIT, SECONDARY BATTERY PROTECTION CIRCUIT, AND BATTERY PACK

CROSS-REFERENCE TO RELATED APPLICATIONS

This patent application is based on and claims priority pursuant to 35 U.S.C. §119 to Japanese Patent Application No. 2010-207437, filed on Sep. 16, 2010, in the Japan Patent Office, the entire disclosure of which is hereby incorporated by reference herein.

BACKGROUND OF THE INVENTION

1. Field of the Invention

The present disclosure relates to a voltage switching circuit, a secondary battery protection circuit incorporating the voltage switching circuit, and a battery pack for a secondary battery, such as a lithium-ion battery used for electronic equipment, incorporating the secondary battery protection circuit.

2. Description of the Background Art

Recently, small hand-held electronic devices, such as mobile phones, digital cameras, laptop computers, and personal digital assistances (PDA) and the like, have become very popular. Typically, secondary batteries (rechargeable batteries) consisting of a high-capacity battery such as a nickel metal hydride battery, a lithium-ion battery, or a lithium polymer battery have come to be widely used in those portable electronic devices. A drawback of such a configuration is that accidental short-circuiting or overcharging can send a high current through the battery and connecting circuitry, which may cause the battery to overheat or even destroy the electronic device. In addition, overcharging the lithium-ion secondary battery causes metallic lithium to be deposited and may pose an accident. Further, over-discharge degrades the battery.

To avoid the above-described problems, a protection switch is provided in a charge-discharge route between the secondary battery and the electronic device. When the protection switch detects that a charging voltage exceeds a predetermined voltage (overcharge) or that a discharging voltage falls below a predetermined voltage (over-discharge), the protection switch is turned off, which prevents further overcharge and over-discharge. In order to prevent short-circuiting and abnormal charging of the battery pack caused by excess current, the protection switch changes the secondary battery to a charging inhibit state and a discharging inhibit state when the charging current or the discharging current exceeds a certain level.

In a conventional charge-discharge protection circuit for the secondary battery (secondary battery protection circuit), a negative terminal of the battery pack and a negative terminal of a charger connection (charger negative power supply terminal) are set as excess-current detection terminals, a charge-discharge control metal oxide semiconductor (MOSFET) is used as a resistor, a current flowing through the MOSFET is converted to voltage using an ON resistance of the MOSFET, and the voltage is input to the secondary battery protection circuit, which controls the excess current.

However, heating of the charge-discharge control MOSFET caused by the flow of current and differences in the ON resistance of the MOSFET from one manufacturer to the next hinders improvement in excess current detection accuracy.

In an effort to counteract the above-described problem, JP-2005-168159-A proposes a secondary battery protection integrated circuit (IC) that improves the excess current detection accuracy by using a current-detection resistor to convert current to voltage.

The secondary battery protection IC includes two charge-discharge control MOSFET. When the excess current is detected with the current-detection resistor, the secondary battery protection IC outputs a charge-discharge control signal after excess current detection and turns the corresponding charge-discharge control MOSFET off, which restrains the current.

At this time, since one of the charge-discharge control MOSFET is turned off, the flow of current is stopped, the voltage converted from the current by the current-detection resistor and input is dropped, and the secondary battery protection IC immediately returns to a state in which the current flows. Therefore, in order to prevent return to such a state once the excess current is detected, a latch operation is required of the internal circuitry of the protection IC. In addition, to return from the latched state after excess current detection to a chargeable-dischargeable state, certain conditions must be taken into account.

SUMMARY

In one aspect of this disclosure, there is a provided a voltage switching circuit for a secondary battery protection circuit installed in a battery pack having a negative power supply terminal and a current-detection resistor. The voltage switching circuit includes a first input terminal, a second input terminal, an output terminal, and a selection terminal. A voltage obtained by converting a current flowing through the current-detection resistor of the battery pack to voltage is supplied to the first input terminal. A voltage at the negative power supply terminal of the battery pack and a voltage at a charger negative power supply terminal of the secondary battery protection circuit are supplied to the second input terminal. The output terminal outputs an output voltage to a detection circuit in the secondary battery protection circuit. The selection terminal selects either the voltage from the first input terminal or the voltage from the second input terminal as the output voltage for output through the output terminal. The voltage switching circuit causes the output voltage to switch between the voltage from the first input terminal and the voltage from the second input terminal in accordance with selection of the selection terminal when either an excess current is detected with the battery pack in a chargeable-dischargeable state or when the battery pack returns to the chargeable-dischargeable state from a charge-discharge inhibit state.

In another aspect of this disclosure, there is a provided a secondary battery protection circuit installed in a battery pack having a negative power supply terminal, a current-detection resistor, and a switching element connected in series to the current-detection resistor, the battery pack connected to a secondary battery and one of a charger and a load. The secondary battery protection circuit includes a sensing terminal, a charger negative power supply terminal, the above-described voltage switching circuit, and a detection circuit. The sensing terminal is connected between the current-detection resistor and the switching element, and a voltage obtained by converting a current flowing through the current-detection resistor to voltage is supplied to the sensing terminal. The charger negative power supply terminal is connected to the negative power supply terminal of the battery pack. The detection circuit detects an excess current and output a detection result to the selection terminal of the voltage switching circuit to switch off the switching element and shut off the current flowing through the switching element and the current-detection resistor when an excess current is detected.

In yet another aspect of this disclosure, there is a provided a battery pack to charge and discharge a secondary battery, connected to one of a charger and a load. The battery pack includes a negative power supply terminal, a switching element, a current-detection resistor, and the above-described secondary battery protection circuit including the voltage switching circuit. The negative power supply terminal is connected to one of negative terminals of the charger and the load. The switching element connects and disconnects the secondary battery and one of the charger and the load. The current-detection resistor detects a charging current and a discharging current, connected in series to the switching element.

BRIEF DESCRIPTION OF THE DRAWINGS

A more complete appreciation of the aforementioned and other features, aspects and advantages of the present disclosure will be better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views, particularly to FIG. 1, a battery pack including a secondary battery protection circuit according to illustrative embodiments is described.

Figure 1:
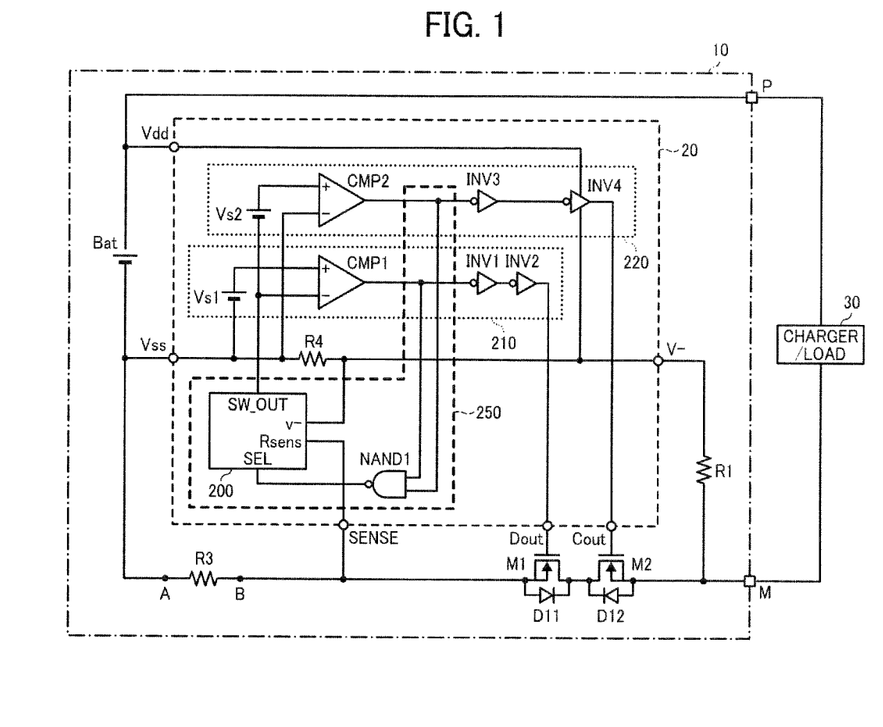
FIG. 1 illustrates circuitry of a battery pack including a secondary battery protection circuit according to the present disclosure.

FIG. 1 illustrates circuitry of a battery pack 10 including a secondary battery protection circuit 20. The battery pack 10 further includes a discharge-control NMOS transistor M1, a charge-control NMOS transistor M2, a current-control resistor R1, and a current-detection resistor R3. A secondary battery Bat is attached in the battery pack 10. The discharge-control NMOS transistor M1 functions as a first switching element, and the charge-control NMOS transistor M2 functions as a second switching element. The inverters INV1 and INV2 function as discharge control elements of switching control elements, and the inverters INV3 and INV4 function as charge control elements of the switching control elements.

In FIG. 1, reference numeral 30 represents a charger or a load, and either the charger or the load 30 is connected to the battery pack 10 including the secondary battery protection circuit 20. A positive electrode of the secondary battery Bat is connected to a positive terminal P of the battery pack 10 and a positive power supply terminal Vdd of the secondary battery protection circuit 20.

A negative electrode of the secondary battery Bat is connected to a negative power supply terminal Vss of the secondary battery protection circuit 20. The current-detection resistor R3 is connected between the negative power supply terminal Vss and a source terminal of the discharge-control NMOS transistor M1. A junction node between the discharge-control NMOS transistor M1 and the current-detection resistor R3 is connected to a sensing terminal SENSE of the secondary battery protection circuit 20.

A drain terminal of the discharge-control NMOS transistor M1 is connected to a drain terminal of the charge-control NMOS transistor M2. A source terminal of the charge-control NMOS transistor M2 is connected to a negative terminal M of the battery pack 10 and a charger negative power-supply terminal V− of the secondary battery protection circuit 20. The current-control resistor R1 is connected to a junction node between the negative terminal M of the battery pack 10 and the charger negative power-supply terminal V− of the secondary battery protection circuit 20.

Gate terminals of the discharge-control NMOS transistor M1 and the charge-control NMOS transistor M2 are connected to a discharge-control terminal Dout and a charge-control terminal Cout of the secondary battery protection circuit 20, respectively.

A diode D11 is connected in parallel to the discharge-control NMOS transistor M1, and a diode D12 is connected in parallel to the charge-control NMOS transistor M2. The diodes D11 and D2 function as parasitic diodes (body diodes) that are generated when the NMOS transistors M1 and M2 are formed in the semiconductor device. The charger/load 30 is connected between the positive terminal P and the negative terminal M of the battery pack 10.

The secondary battery protection circuit 20 includes multiple dedicated detection circuits to detect corresponding overcharge, over-discharge, an excess current of charging, an excess current of discharging, a short-circuit current, and overheating. When detecting abnormal levels requiring protective action, each detection circuit outputs a detection signal to switch off the discharge-control NMOS transistor M1 or the charge-control NMOS transistor M2 connected between the secondary battery Bat and the charger/load 30. Accordingly, the detection circuit shuts off a connection between the secondary battery Bat and the charger/load 30.

A case in which excessive charging current or discharging current, that is, current higher than predetermined values, flow through the battery pack 10 having the above-configured secondary battery protection circuit 20 is considered. When the charging current or discharging current flows in the battery pack 10 in chargeable or dischargeable condition, the charging current or discharging current flows through the current-detection resistor R3, and a voltage obtained by multiplying the current flowing through the current-detection resistor R3 by a resistance of the current-detection resistor R3 ($V=I \times R$) is applied to the sensing terminal SENSE.

At this time, when the voltage at the sensing terminal SENSE exceeds a predetermined setting value with respect to a positive side, the state becomes excess current of discharging detection state or the short-circuit detection state, the discharge-control terminal Dout outputs a low-level signal, and the discharge-control NMOS transistor M1 is turned off, stopping discharging.

Conversely, when the voltage at the sensing terminal SENSE exceeds a predetermined setting value with respect to a negative side, the state becomes excess current of charging detection state, the charge-control terminal Cout outputs a low-level signal, and the charge-control NMOS transistor M2 is turned off, stopping charging.

Next, operation of the secondary battery protection circuit 20 is described below.

The secondary battery protection circuit 20 includes a discharging detection circuit 210 to protect against excess current in discharging, a charging detection circuit 220 to protect against excess current in charging, a resistor R4 that is connected between the charger-negative power-supply terminal V− and the negative power supply terminal Vss and is connected to the voltage switching circuit 200. The discharging detection circuit 210 includes a first reference voltage (reference voltage generator) Vs1, a first comparator CMP1, and two inverters INV1 and INV2. The charging detection circuit 220 includes a second reference voltage (reference voltage generator) Vs2, a second comparator CMP2, and two inverters INV3 and INV4.

Figure 2:
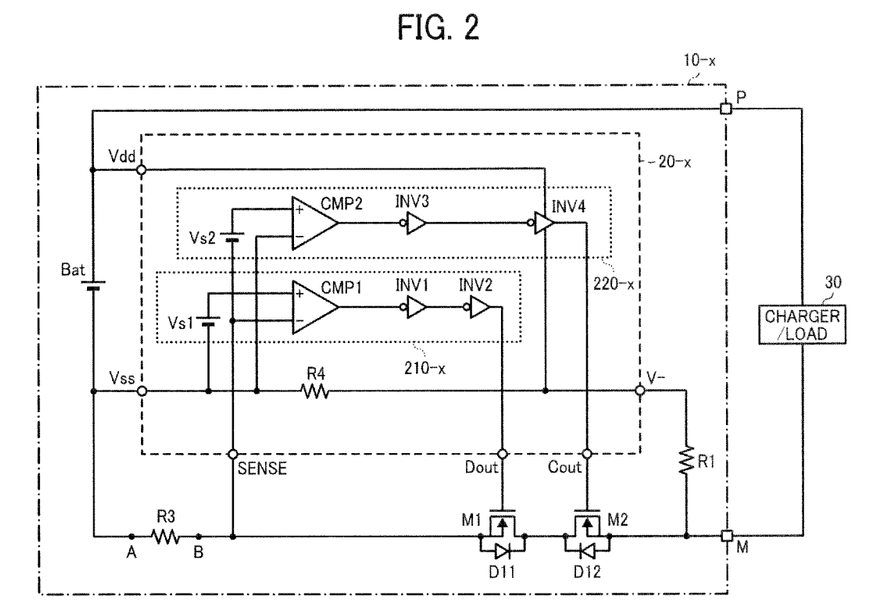
FIG. 2 illustrates circuitry of a battery pack including a secondary battery protection circuit according to a comparative example.

Before proceeding with the description of the operation of the present embodiment, as a comparative example of a secondary battery protection circuit 20-X in which voltage switching circuit 200 is not provided is described below. FIG. 2 illustrates circuitry of the secondary battery protection circuit 20-X according to the comparative example. With reference to FIG. 2, "a discharge state" in which the battery pack 10-X is connected to the load 30 is described as follows:

A positive electrode of the first reference voltage Vs1 is connected to a non-inverting input terminal (+) of the first comparator CMP1, and a negative electrode of the first reference voltage Vs1 is connected to the negative electrode of the power supply (secondary battery Bat) and a first end A of the current-detection resistor R3.

An inverting input terminal (−) of the first comparator CMP1 is connected to a second end B of the current-detection resistor R3 through the sensing terminal SENSE of the secondary battery protection circuit 20-X, and for this reason, the first comparator CMP1 can compare a voltage drop of the current-detection resistor R3 and the reference voltage Vs1.

An output terminal of the first comparator CMP1 is connected to a gate terminal of the discharge-control NMOS transistor M1 (first switching element) through the inverters INV1 and INV2 and the discharge-control terminal Dout of the secondary battery protection circuit 20-X.

A source terminal of the discharge-control NMOS transistor M1 is connected to the second end B of the current-detection resistor R3, and a drain terminal thereof is connected to a drain terminal of the charge-control NMOS transistor M2 (second switching element). A source terminal of the charge-control NMOS transistor M2 is connected to one end of the current-control resistor R1 (negative terminal M side).

With this configuration, when the discharging current is small and the voltage drop of the current-detection resistor R3 is smaller than the first reference voltage Vs1, an output of the first comparator CMP1 becomes high.

The high-level signal is applied to the gate terminal of the discharge-control NMOS transistor M1 through the inverters INV1 and INV2. Consequently, the discharge-control NMOS transistor M1 is turned on. During discharging, since the charge-control NMOS transistor M2 is always on, the discharging current flows from the power supply (secondary battery Bat) to the load 30.

However, when the discharging current becomes greater and the voltage drop of the current-detection resistor R3 is greater than the first reference voltage Vs1, the output of the first comparator CMP1 becomes low. The low-level signal is applied to the gate terminal of the discharge-control NMOS transistor M1 through the inverters INV1 and INV2. Consequently, the discharge-control NMOS transistor M1 is turned off, which cuts off a load current, that is, discharge-control NMOS transistor M1 shuts down the connection between the load 30 and the secondary battery Bat.

Next, a "charge state" in which the battery pack 10-X according to the comparative example shown in FIG. 2 is connected to the charger 30 instead of the load 30.

A positive electrode of the second reference voltage Vs2 is connected to a non-inverting input terminal (+) of the second comparator CMP2, and a negative electrode of the second reference voltage Vs2 is connected to the second end B of the current-detection resistor R3 through the sensing terminal SENSE of the secondary battery protection circuit 20-X.

An inverting input terminal (−) of the second comparator CMP2 is connected to the negative electrode of the power supply (secondary battery Bat) and the first end A of the current-detection resistor R3 through the negative power supply terminal Vss of the secondary battery protection circuit 20, and for this reason, the second comparator CMP2 compares the voltage drop of the current-detection resistor R3 and the second reference voltage Vs2.

An output of the second comparator CMP2 is a gate terminal of the charge-control switching NMOS transistor M2 through the inverters INV3 and INV4 and the charge-control terminal Cout.

With this configuration, when a charging current from the charger 30 is small, and the voltage drop of the current-detection resistor R3 is smaller than the second reference voltage Vs2, an output of the second comparator CMP2 becomes high.

The high-level signal is applied to the gate terminal of the charge-control NMOS transistor M2 through the inverters INV3 and INV4. Consequently, the charge-control NMOS transistor M2 is turned on. During charging, since the discharge-control NMOS transistor M1 is always on, the charging current is supplied from the charger 30 to the secondary battery Bat.

By contrast, when the charging current from the charger 30 is increased and the voltage drop of the current-detection resistor R3 is greater than the second reference voltage Vs2, the output of the second comparator CMP2 becomes low. The low-level signal is applied to the gate terminal of the charge-control NMOS transistor M2 through the inverters INV3 and INV4 and the charge-control terminal Cout. Consequently, the charge-control NMOS transistor M2 is turned off, which stops the charging current from flowing to the secondary battery Bat, that is, the charge-control NMOS transistor M2 shuts down the connection between the charger 30 and the secondary battery Bat.

However, in above-described battery pack 10-X of the comparative example in which the voltage switching circuit 200 is not provided, when the excess current is detected, either the discharge-control NMOS transistor M1 or the charge-control NMOS transistor M2 is turned off, the current is stopped, and the voltage converted by the current-detection resistor R3 and to be input is decreased, immediately after which the current flows. In order to prevent the current from flowing again immediately, it is necessary to latch the circuit at a state in which the excess current is detected. In a state in which the circuit is latched, it is necessary that the latched state is unlatched when the excess current or the abnormal charger is released, and the circuit returns to a state in which the current flows.

In an effort to counteract the above-described problem, in the embodiments of the present disclosure, the voltage switching circuit 200 is provided in the secondary battery protection circuit 20. Differing from the comparative example shown in FIG. 2, the secondary battery protection circuit 20 further includes a circuit 250, including the voltage switching circuit 200 and a NAND 21, surrounded by a broken line in FIG. 1.

A configuration of the voltage switching circuit 200 is described in further detail below with reference to FIGS. 3 and 4.

More specifically, a first input terminal Rsens of the voltage switching circuit 200 is connected to the sensing terminal SENSE of the secondary battery protection circuit 20 that is connected between the second end B of the current-detection resistor R3 and the NMOS transistors M1 and M2. A voltage obtained by converting a current flowing through the current-detection resistor R3 is supplied to the first input terminal Rsens of the voltage switching circuit 200.

A second input terminal v− of the voltage switching circuit 200 is connected to the charger negative power supply terminal V− of the secondary battery protection circuit 20 that is connected to the negative terminal M of the battery pack 10. A voltage at the negative terminal M of the battery pack 10 and a voltage at the charger negative power supply terminal V− of the secondary battery protection circuit 20 are supplied to the second input terminal v− of the voltage switching circuit 200.

Output signals of the respective the comparators CMP1 and CMP2 are input to a NAND 1, and an output signal of the NAND 1 is input to a selection terminal SEL of the voltage switching circuit 200.

The negative electrode of the second reference voltage Vs2 and the inverting terminal (−) of the comparator CMP1 are connected to an output terminal SW_OUT of the voltage switching circuit 200. An output voltage (output signal) in the voltage switching circuit 200 is output to either the detection circuits 210 or 220 (comparators CMP1 or CMP2).

With this configuration, the voltage switching circuit 200 selects either the voltage from the first input terminal Rsens or the voltage from the second input terminal v− for output through the output terminal SW_OUT.

First Embodiment

Figure 3:
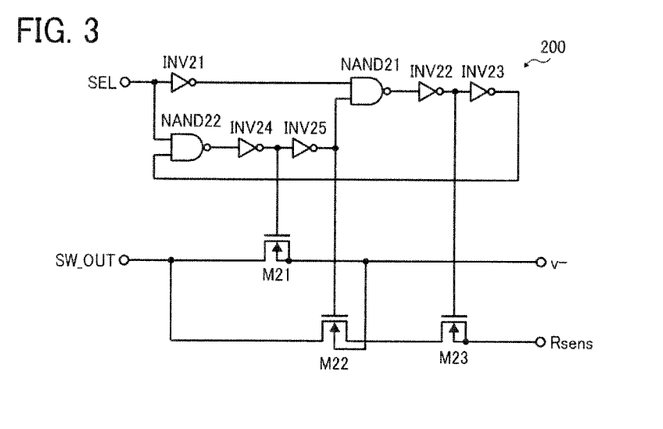
FIG. 3 illustrates circuitry of a voltage switching circuit that switches an output voltage between two voltages in accordance with a selection signal according to a first embodiment, installed in the secondary battery protection circuit shown in FIG. 1.

FIG. 3 illustrates circuitry of the voltage switching circuit 200 according to a first embodiment. As illustrated in FIG. 3, the voltage switching circuit 200 switches an output signal SW_OUT$_{sig}$, to be input to the first comparator CMP1 and the second comparator CMP2 to detect the excess current, between a terminal voltage at the first input terminal Rsens connected to the sensing terminal voltage SENSE of the secondary battery protection circuit 20 and a terminal voltage at the second input terminal v− connected to the charger-negative power-supply terminal V− of the secondary battery protection circuit 20 based on a selection signal SEL$_{sig}$ generated from output signals of the first comparator CMP1 and the second comparator CMP2.

A feature of the voltage switching circuit 200 according to the present embodiment is that selection of signals (Rsense$_{sig}$ or V−$_{sig}$) and switching timings of the NMOS transistors M1 and M2 are determined by using NAND and inverter logic circuits.

More specifically, the voltage switching circuit 200 includes NAND circuits (hereinafter just "NAND") 21 and 22, and inverters INV21, INV22, INV23, INV24, and INV25, and NMOS transistors M21, M22, and M23.

In the voltage switching circuit shown in FIG. 3, when the selection signal SEL$_{sig}$ is high, the inverter INV21 receives the high-level signal and outputs a low-level signal to one input of the NAND 21.

Since one of input terminal of the NAND 21 is low, the NAND 21 outputs a high-level signal. Then, the inverter INV22 receives the high-level signal and outputs a low-level signal to a gate terminal of the NMOS transistor M23 and the inverter INV23.

The inverter INV23 inverts the signal and outputs a high-level signal to one input terminal of the NAND 22. Since the selection signal SEL$_{sig}$ is input to the other input terminal of the NAND 22, signals input to the input terminals of the NAND 22 are both high, and the NAND 22 outputs a low-level signal.

The inverter INV24 receives the low-level signal from the NAND 22 and outputs a high-level signal to a gate terminal of the NMOS transistor M21 and the inverter INV25. The inverter INV25 inverts the high-level signal and outputs a low-level signal to a gate terminal of the NMOS transistor M22 and the other input terminal of the NAND 21.

At this time, the NMOS transistor M21 is on, the NMOS transistor M22 is off, and NMOS transistor M23 is off, and the output signal SW_OUT$_{sig}$ is identical to the voltage at the second input terminal v−.

Conversely, when the selection signal SEL$_{sig}$ is low, the inverter INV21 and the NAND 22 receive the low-level signal. Since one of input terminal of the NAND 22 is low, the NAND 22 outputs a high-level signal. Accordingly, the inverter INV24 receives the high-level signal and outputs a low-level signal to the gate terminal of the NMOS transistor M21 and the inverter INV25.

The inverter INV25 inverts the high-level signal and outputs a high-level signal to the one input terminal of the NAND 21 and the gate terminal of the NMOS transistor M22. The other input terminal of the NAND 21 receives the high-level signal from the inverter INV21. Since signal input to the input terminals of the NAND 21 are both high, the NAND 21 outputs a low-level signal. The inverter INV22 receives the low-level signal from the NAND 21 and outputs a high-level signal to the gate terminal of the NMOS transistor M23 and the other input terminal of the NAND 22.

At this time, the NMOS transistor M21 is off, the NMOS transistor M22 is on, and NMOS transistor M23 is on, and the output signal SW_OUT$_{sig}$ is identical to the voltage at the first input terminal Rsens.

A back bias of the NMOS transistor M22 is connected to the second input terminal v−, which prevents current leakage.

More specifically, when the NMOS transistor M21 is on, the NMOS transistors M22 and M23 are off, and when the NMOS transistor M21 is off, the NMOS transistors M22 and M23 are on. Either the voltage at the second input terminal v− or the voltage at the first input terminal Rsens is selected as the output signal SW_OUT$_{sig}$ for output.

In addition, it is preferable that level transmission of the signals to the gate terminals of the NMOS transistors M21, M22, and M23 be changed by level conversion using a level shift circuit so that the NMOS transistors M21, M22, and M23 reliably open and close while satisfying thresholds of the NMOS transistors M21, M22, and M23 in accordance with the circuit configuration. It is to be noted that it is not necessary to provide the additional level shift circuit in a case in which the level conversion function is installed in the inverters INV24, INV25, and INV22.

Second Embodiment

Figure 4:
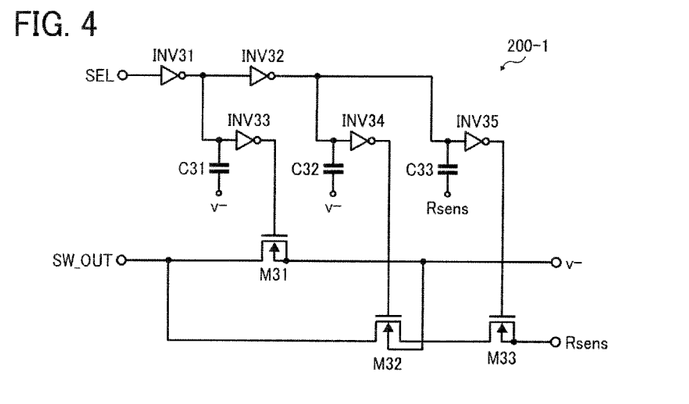
FIG. 4 illustrates circuitry of a voltage switching circuit according to a second embodiment.

FIG. 4 illustrates circuitry of a voltage switching circuit 200-1 according to a second embodiment that is installable in the secondary battery protection circuit 20 shown in FIG. 1. As illustrated in FIG. 4, the voltage switching circuit 200-1 switches a signal SW_OUT$_{sig}$, to be input to the first comparator CMP1 and the second comparator CMP2 to detect the excess current, between a terminal voltage at the first input terminal Rsens and a terminal voltage at the second input terminal v– based on the selection signal SEL$_{sig}$ generated from output signals from the first comparator CMP1 and the second comparator CMP2.

A feature of the voltage switching circuit 200-1 is that the output signal SW_OUT is selected by using inverter logic circuits and switching timing of the NMOS transistor is determined by capacitances of the capacitors.

In FIG. 4, the voltage switching circuit 200-1 includes inverters INV31, INV32, INV33, INV34, and INV35, and NMOS transistors M31, M32, and M33, and capacitors C31, C32, and C33.

In the voltage switching circuit 200-1, when the selection signal SEL$_{sig}$ is high, the inverter INV31 receives the high-level signal and outputs a low-level signal to the inverters INV32 and INV33. The capacitor C31 that sets delay is connected to an input terminal of the inverter INV33. The inverter INV33 outputs a high-level signal to a gate terminal of the NMOS transistor M31.

The inverter INV32 outputs a high-level signal to input terminals of the inverters INV34 and INV35. The capacitors C32 and C33 that set delay times are connected to input terminals of the respective inverters INV34 and INV35. The inverter INV34 outputs a low-level signal to the gate terminal the NMOS transistor M32. The inverter INV35 outputs a low-level signal to the gate terminal of the NMOS transistor M33.

Conversely, when the selection signal SEL$_{sig}$ is low, the inverter INV31 receives the low-level signal and outputs a high-level signal to the inverters INV32 and INV33. The capacity C31 that sets delay is connected to the input terminal of the inverter INV33. The inverter INV33 outputs the low-level signal to the gate terminal of the NMOS transistor M31.

The inverter INV32 outputs a low-level signal to the input terminals of the inverters INV34 and INV35. The capacities C32 and C33 that set delay times are connected to the input terminals of the respective inverters INV34 and INV35. The inverter INV34 outputs a high-level signal to the gate terminal of the NMOS transistor M32. The inverter INV35 outputs a high-level signal to the gate terminal of the NMOS transistor M33.

As described above, the capacitors C31, C32, and C33 are connected to the respective inverter logic circuits INV33, INV34, and INV35, and ON-OFF timings of the NMOS transistors can be set by adjusting the capacitances of the capacitors. In connection of the capacitors, the capacities of the capacitors and connection positions thereof are set orbital by switching timings of the NMOS transistors.

When the NMOS transistor M31 is on, the NMOS transistors M32 and M33 are off, and when the NMOS transistor M31 is off, the NMOS transistors M32 and M33 are off. Thus, the output signal SW_OUT$_{sig}$ at the output terminal SW_OUT is selected either the voltage at the second input terminal v– or the voltage at the first input terminal Rsens.

In addition, it is preferable that the level transmission of the signals to the gate terminals of the NMOS transistors M31, M32, and M33 be changed by level conversion using a level shift circuit so that the control NMOS transistors M31, M32, and M33 reliably open and close while satisfying thresholds of the NMOS transistors M31, M32, and M33 in accordance with the circuit configuration. It is to be noted that it is not necessary to provide the additional level shift circuit in a case in which the level conversion function is installed in the inverters INV33, INV34, and INV35.

Figure 5:
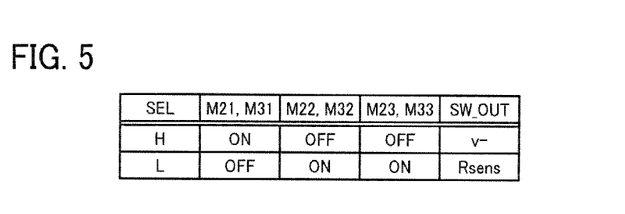
FIG. 5 is a table showing a relation between the selection signals and NMOS transistors included in the voltage switching circuits shown in FIGS. 3 and 4.

FIG. 5 is a table showing values of the selection signal SEL$_{sig}$ (high or low), states (on or off) of the respective NMOS transistors M21, M31, M22, M32, M23, and M33, and state (voltage at the second input terminal v– (signal V–$_{sig}$) or voltage at the first input terminal Rsens (signal Rsens$_{sig}$)) of the output signal SW_OUT$_{sig}$.

As illustrated in FIG. 5, the voltage switching circuits 200 and 200-1 output the signal Rsense$_{sig}$ when the excess current is detected. More specifically, when the excess current is detected in a chargeable-dischargeable state, by outputting the signal Rsense$_{sig}$ (voltage) at the second input terminal Rsens to the detection circuit 210 or 220, the corresponding control NMOS transistors M1 or M2 (switching element) is turned off to shut off a connection between the secondary battery Bat and the charger/load 30. With this process, the battery pack 10 becomes a charge-discharge inhibit state, and charge-discharge inhibit state (excess-current detection state) is latched so as not to return to the previous state (chargeable-dischargeable state) immediately.

During the charge-discharge inhibit state, by shutting off the connection between the secondary battery Bat and the charger/load 30, the terminal voltages at the charger negative power-supply terminal V– of the secondary battery protection circuit 20 and the negative terminal M of the battery pack 10 are pulled down to a terminal voltage at the negative power supply terminal Vss of the secondary battery protection circuit 20 by a resistor R4. Then, when the terminal voltages at the charger negative power-supply terminal V– and the negative terminal M reaches the terminal voltage at the negative power supply terminal Vss, the latched state is unlatched and the battery pack 10 automatically returns to the chargeable-discharge state from the charge-discharge inhibit state.

By installing the voltage switching circuit 200 or 200-1 as shown in FIG. 3 or 4 in an excess current detection returning circuit in the secondary battery protection circuit 20, the secondary battery protection circuit 20 can either detect the terminal voltage at the sensing terminal SENSE when the excess current is detected or detect the terminal voltage at the charger-negative power supply V– when the state is returned.

In addition, since a pull down circuit (resistor R4 shown in FIG. 1) that pulls down the terminal voltage V– to the terminal voltage at the negative power supply terminal Vss after the excess current is detected (during the charge-discharge inhibit state) is installed in the secondary battery protection circuit, the circuit state can be automatically returned from the charge-discharge inhibit state when the excess current load or the abnormal charger are released. That is, the pull down circuit pulls down the voltages at the charger negative power supply terminal V– of the secondary battery protection circuit 200 and the negative terminal M of the battery pack 10 to the voltage at the negative power supply terminal Vss of the secondary battery protection circuit 20 while the battery pack 10 is in the charge-discharge inhibit state, causing the battery pack 10 to automatically return to the chargeable-discharge state from the charge-discharge inhibit state.

Herein, the excess current protection circuit 20 may also protect against over-discharge of the secondary battery Bat. "Over-discharge" is a state in which the battery voltage is decreased beneath a predetermined over-discharge voltage (for example, 2.3 V) when the charger 30 is used. When over-discharge occurs, charging capacity is degraded, and therefore, lifetime of the battery is decreased.

In order to respond to the over-discharge, in the present disclosure, the secondary battery protection circuit 20 further includes a reference voltage generator (not shown) to generate a reference voltage (e.g., 0.6 V) and a divider (not shown) that outputs a voltage of 0.6 V by using a dividing resistor when the over-discharging voltage between the positive power supply terminal Vdd and the negative power supply terminal Vss is 2.3 V. A third comparator (not shown) compares an output of the divider and the reference voltage (0.6 V) of the reference voltage generator, detects the state as the over-discharge when the output voltage of the divider is smaller than the reference voltage, and outputs a low-level signal to the discharge-control terminal Dout. In the present configuration, a signal output from the third comparator and the signal from the inverter INV2 are input into an OR circuit (not shown). At this time, the discharge-control NMOS transistor M1 is turned off through the discharge-control terminal Dout.

In addition, the excess current protection circuit 20 may also protect against the overcharge of the secondary battery Bat. "Overcharge" is a state in which the battery voltage of the charger exceeds a predetermined voltage (e.g., 4.3V).

In order to respond to the overcharge, in the present disclosure, the secondary battery protection circuit 20 further includes a reference voltage generator (not shown) to generate a reference voltage (e.g., 0.6 V) and a divider (not shown) that outputs a voltage of 0.6 V by using a dividing resistor when the over-discharging voltage between the positive power supply terminal Vdd and the negative power supply terminal Vss is 4.3 V. A fourth comparator (not shown) compares an output of the divider and the reference voltage (0.6 V) of the reference voltage generator, detects the state as the over-discharge when the output of the divider is greater than the reference voltage, and outputs a low-level signal to the charge-control terminal Cout. In the present configuration, a signal output from the fourth comparator and the signal from the inverter INV4 are input into an OR circuit. At this time, the second switching element M2 is turned off through the charge-control terminal Cout.

In addition, the circuit configuration of the battery pack including the secondary battery protection circuit are not limited to the above-described embodiments, and various modifications and improvements in the material and shape of the battery pack are possible without departing from the spirit and scope of the present invention. Although the secondary battery protection circuit 20 according to this patent specification may be implemented in the secondary batteries for installation in various electronic devices, such as laptop personal computers or note PCs, mobile phones, digital cameras, and personal digital assistants (PDAs), this disclosure is not limited to the use of the secondary battery but also used for power supply circuits for protecting against the excess current.

In addition, although the secondary battery protection circuit 20 can be correspond for both excess currents in discharging and charging, it is not necessary to the secondary battery protection circuit 20 be not treat both. In a case in which the secondary battery protection circuit can be treated for only the excess current in discharging, the secondary battery protection circuit 20 includes only the charging protection circuit, which can downsize the chip, and reduce cost. Similarly, by providing only charging protection circuit in the secondary battery protection circuit, the secondary battery protection circuit can protect only the excess current in the charging.

In addition, as described above, although the secondary battery protection circuit 20 is provided inside the battery pack 10 for installation in various electronic devices, such as laptop personal computers or note PCs, mobile phones, digital cameras, and personal digital assistants (PDAs), the battery pack 10 can be provided separately from the secondary battery Bat. The various electronic devices using the excess current protection circuit is not limited to the mobile electronic devices.

Although the secondary battery protection circuit has functions of detection and protection of over-discharge and overcharge in addition to detection of the excess current in discharging and charging, the secondary battery protection circuit does not necessarily have to include the functions of detection and protection of over-discharge and overcharge.

Numerous additional modifications and variations are possible in light of the above teachings. It is therefore to be understood that, within the scope of the appended claims, the disclosure of this patent specification may be practiced otherwise than as specifically described herein.

What is claimed is:

1. A voltage switching circuit for a secondary battery protection circuit installed in a battery pack having a negative power supply terminal and a current-detection resistor,
the voltage switching circuit comprising:
a first input terminal to which a voltage obtained by converting a current flowing through the current-detection resistor of the battery pack to voltage is supplied;
a second input terminal to which a voltage at the negative power supply terminal of the battery pack and a voltage at a charger negative power supply terminal of the secondary battery protection circuit are supplied;
an output terminal to output an output voltage to a detection circuit in the secondary battery protection circuit; and
a selection terminal to select either the voltage from the first input terminal or the voltage from the second input terminal as the output voltage for output through the output terminal,
wherein the voltage switching circuit causes the output voltage to switch between the voltage from the first input terminal and the voltage from the second input terminal in accordance with selection of the selection terminal either when an excess current is detected with the battery pack in a chargeable-dischargeable state or when the battery pack returns to the chargeable-dischargeable state from a charge-discharge inhibit state.

2. The voltage switching circuit according to claim 1, wherein the voltage switching circuit selects the voltage from the first input terminal for output to the detection circuit when the excess current is detected in the chargeable-dischargeable state of the battery pack.

3. The voltage switching circuit according to claim 1, wherein the voltage switching circuit selects the voltage from the second input terminal for output to the detection circuit when the battery pack returns from the charge-discharge inhibit state to the chargeable-dischargeable state.

4. The voltage switching circuit according to claim 1, wherein the voltage switching circuit comprises three transistors and a logic circuit including inverters and NAND circuits, and the voltage switching circuit selects the output voltage using the logic circuit and determines a switching timing using the transistors.

5. The voltage switching circuit according to claim 1, wherein the voltage switching circuit comprises three transistors and a logic circuit including inverters and capacitors, and the voltage switching circuit selects the output voltage using the logic circuit and determines a switching timing using capacitances of the capacitors.

6. A secondary battery protection circuit installed in a battery pack having a negative power supply terminal, a current-detection resistor, and a switching element connected in series to the current-detection resistor, the battery pack connected to a secondary battery and one of a charger and a load,
the secondary battery protection circuit comprising:
a sensing terminal, connected between the current-detection resistor and the switching element, to which a voltage obtained by converting a current flowing through the current-detection resistor to voltage is supplied;
a charger negative power supply terminal connected to the negative power supply terminal of the battery pack;
a voltage switching circuit to cause an output voltage to switch,
the voltage switching circuit comprising:
a first input terminal to which the voltage at the sensing terminal is supplied;
a second input terminal to which a voltage at the negative power supply terminal of the battery pack and a voltage at the charger negative power supply terminal of the secondary battery protection circuit are supplied;
an output terminal to output the output voltage; and
a selection terminal to select either the voltage from the first input terminal or the voltage from the second input terminal for output through the output terminal as the output voltage; and
a detection circuit to detect an excess current and output a detection result to the selection terminal of the voltage switching circuit to switch off the switching element and shut off the current flowing through the switching element and the current-detection resistor when the excess current is detected.

7. The secondary battery protection circuit according to claim 6, wherein the voltage switching circuit selects the voltage from the first input terminal connected to the sensing terminal for output to the detection circuit to cause the switching element to turn off to shut off the current flowing through the switching element and the current-detection resistor, when the excess current is detected with the battery pack in a chargeable-dischargeable state.

8. The secondary battery protection circuit according to claim 6, wherein the voltage switching circuit selects the voltage from the second input terminal connected to the charger negative power supply terminal for output to the detection circuit to cause the switching element to turn on to release the current flowing through the switching element and the current-detection resistor when the battery pack returns to a chargeable-dischargeable state from a charge-discharge inhibit state.

9. The secondary battery protection circuit according to claim 6, wherein the detection circuit comprises:
a reference voltage generator to generate a predetermined reference voltage;
a comparator to compare the output voltage from the output terminal of the voltage switching circuit with the predetermined reference voltage generated by the reference voltage generator and output a comparison result to the selection terminal of the voltage switching circuit; and
a switching control element to control the switching element so that the switching element is turned off and shuts off the current flowing through the switching element and the current-detection resistor when the excess current is detected.

10. The secondary battery protection circuit according to claim 9, wherein the detection circuit further comprises a discharge detection circuit that detects the excess current in discharging, and the switching control element comprises a discharge control element to cause the switching element to turn off and shut off a discharging current flowing through the switching element and the current-detection resistor when the output voltage from the output terminal of the voltage switching circuit exceeds the predetermined reference voltage based on the comparison result.

11. The secondary battery protection circuit according to claim 10, further comprising an over-discharge detection circuit, wherein the discharge control element causes the switching element to turn off and shut off the discharging current flowing through the switching element and the current-detection resistor when over-discharge is detected.

12. The secondary battery protection circuit according to claim 9, wherein the detection circuit further comprises a charging detection circuit that detects the excess current in charging, and the switching control element comprises a charge control element to cause the switching element to turn off and shut off a charging current flowing through the switching element and the current-detection resistor when the output voltage from the output terminal of the voltage switching circuit exceeds the predetermined reference voltage based on the comparison result.

13. The secondary battery protection circuit according to claim 12, further comprising an over-charge detection circuit, wherein the charge control element causes the switching element to turn off and shut off the charging current flowing through the switching element and the current-detection resistor when over-charge is detected.

14. The secondary battery protection circuit according to claim 9, wherein:
the secondary battery protection circuit is connected to the switching element including a first switching element and a second switching element,
the detection circuit comprises a discharging detection circuit that detects the excess current during discharge and a charging detection circuit that detects the excess current during charging,
the reference voltage generator comprises a first reference voltage generator to generate a predetermined first reference voltage and a second reference voltage generator to generate a predetermined second reference voltage,
the comparator comprises a first comparator that compares the output voltage from the output terminal of the voltage switching circuit with the predetermined first reference voltage during discharging, and a second comparator that compares the output voltage from the output terminal of the voltage switching circuit with the predetermined second reference voltage during charging, and,
the switching control element comprises a discharge control element and a charge control element, the charge control element to cause the first switching element to turn off and shut off a discharging current flowing through the first switching element and the current-detection resistor when the output voltage from the output terminal of the voltage switching circuit exceeds the predetermined first reference voltage based on the comparison result during discharge and the charge control element to cause the second switching element to turn off and shut off a charging current flowing through the second switching element and the current-detection resistor when the output voltage from the output terminal of the voltage switching circuit exceeds the predetermined second reference voltage based on the comparison result during charging.

15. The secondary battery protection circuit according to claim 14, further comprising an over-discharge detection circuit, wherein the discharge control element causes the first switching element to turn off and shut off the discharging current flowing through the first switching element and the current-detection resistor when over-discharge is detected.

16. The secondary battery protection circuit according to claim 14, further comprising an overcharge detection circuit, wherein the charge control element causes the second switching element to turn off and shut off the charging current flowing through the second switching element and the current-detection resistor when overcharge is detected.

17. A battery pack to charge and discharge a secondary battery, connectable to one of a charger and a load,
the battery pack comprising:
a negative power supply terminal connected to one of negative terminals of the charger and the load;
a switching element to connect and disconnect the secondary battery and one of the charger and the load;
a current-detection resistor to detect a charging current and a discharging current, connected in series to the switching element; and
a secondary battery protection circuit to protect the secondary battery from an excess current,
the secondary battery protection circuit comprising:
a sensing terminal connected between the current-detection resistor and the switching element, to which a voltage obtained by converting a current flowing through the current-detection resistor to voltage is supplied;
a charger negative power supply terminal, connected to the negative power supply terminal of the battery pack, to which a voltage at the negative power supply terminal of the battery pack is supplied;
a detection circuit to detect the excess current; and
a voltage switching circuit, having a first input terminal to which the voltage at the sensing terminal is supplied, a second input terminal to which a voltage at the negative power supply terminal of the battery pack and a voltage at the charger negative power supply terminal of the secondary battery protection circuit are supplied, an output terminal to output an output voltage to the detection circuit, and a selection terminal to which an output signal from the detection circuit is supplied and to select either the voltage from the first input terminal or the voltage from the second input terminal for output through the output terminal as the output voltage,
wherein the voltage switching circuit switches between the voltage from the first input terminal and the voltage from the second input terminal for output as the output voltage when either excess current is detected while the battery pack is in a chargeable-dischargeable state or the battery pack returns to the chargeable-dischargeable state from a charge-discharge inhibit state.

18. The battery pack according to claim 17, wherein the voltage switching circuit selects the voltage from the first input terminal connected to the sensing terminal for output to the detection circuit to cause the switching element to turn off to shut off a connection between the secondary battery and the one of the charger and the load when the excess current is detected with the battery pack in the chargeable-dischargeable state.

19. The battery pack according to claim 17, wherein the voltage switching circuit selects the voltage from the second input terminal connected to the charger negative power supply terminal for output to the detection circuit to cause the switching element to turn on to connect the secondary battery and the one of the charger and the load when a state of the secondary pack returns to the chargeable-dischargeable state from the charge-discharge inhibit state.

20. An electronic device employing the battery pack of claim 17.

* * * * *